Sept. 7, 1954 J. F. BELL 2,688,682
LIQUID HANDLING AND TRANSPORTING APPARATUS
Filed Oct. 30, 1951
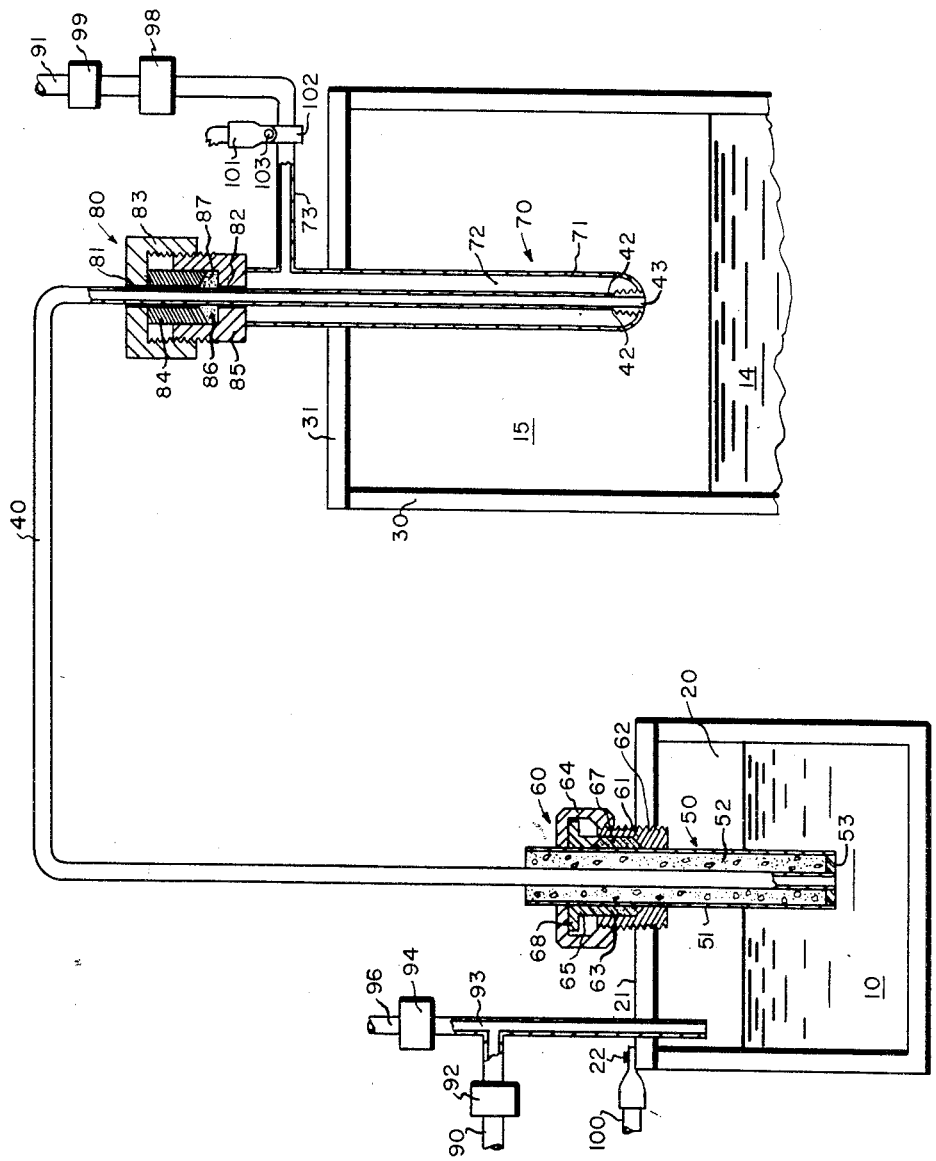
INVENTOR.
JAMES F. BELL
BY
Kenneth Swartwood Patented Sept. 7, 1954

2,688,682

UNITED STATES PATENT OFFICE 2,688,682

LIQUID HANDLING AND TRANSPORTING APPARATUS

James F. Bell, Royal Oak, Mich., assignor to Ethyl Corporation, New York, N. Y., a corporation of Delaware Application October 30, 1951, Serial No. 253,932

2 Claims. (Cl. 219—11)

This invention relates to an apparatus for handling and transporting liquids and more particularly, but not exclusively, to a novel apparatus for feeding molten sodium-lead alloy from an alloy melting or storage pot into a reactor pot for reacting with ethyl chloride to form tetraethyllead and for protecting the alloy against deterioration during the feeding, such as by oxidation in air.

Tetraethyllead is manufactured by the reaction of a sodium-lead alloy with ethyl chloride. In the commercial process employed at the present time, the alloy is reacted in the form of a granular solid with ethyl chloride. Considerable effort has been expended in the development of a process employing molten alloy, preferably carrying out the process on a continuous basis. The feeding of such molten alloy in a continuous reaction, normally operating under pressure and at high temperature, has caused difficulty.

In practicing the improved process, the sodium-lead alloy is melted and stored in an alloy pot and is fed to a separate reactor containing liquid ethyl chloride as required in the process. In consequence, it is necessary to heat the feed pipe from the alloy pot to the reactor to prevent cooling of the alloy therein and, thus, to prevent clogging or plugging of the feed line due to solidification of the molten material.

Where the feed apparatus for the alloy permits the alloy to drain from the conduit back into the alloy pot or empty into the reactor pot, upon interruption of feed, difficulty has been experienced in the diffusion of ethyl chloride vapors into the feed conduit. These vapors react with the sodium-lead alloy within the conduit and cause considerable difficulty in operation of the process.

In the continuous process for forming tetraethyllead, other problems are encountered in feeding the sodium-lead alloy to the ethyl chloride into the reactor. It is necessary to meter the sodium-lead alloy at a highly constant and controlled rate into the reactor, and, thus, it is essential that an accurate and positive means be provided for controlling the flow of the alloy. In addition, since the reaction is carried out under pressure, it is necessary to provide an alloy feeding apparatus which may operate to feed the alloy into the pressurized reactor while exhibiting the flexibility of control required for continuous plant operation.

Prior attempts have been made to heat the transfer conduit by the passage of high amperage current for a length extending from the alloy pot to the reactor pot. The entry end of the feed conduit extends below the level of the molten alloy in the alloy pot but this alloy level is frequently somewhat below the section of conduit which is heated by the electrical current. Further attempts have been made to direct the current through the alloy and thence through the conduit without appreciable success.

Two problems have been prevalent in the efficient and trouble-free operation of the above apparatus. The first problem involves the solidification of alloy in the section of conduit extending within the alloy pot. The level of the molten alloy within the pot changes frequently due to the removal of alloy during the feeding periods and to the occasional replenishing of additional portions of alloy. In operation, considerable amounts of impurities, consisting of metal oxides and the like, commonly called dross, float on the surface of the alloy and tend to collect and adhere to the external surface of the conduit. Since this conduit is used as an electrical resistance to heat the same, accumulation of such impurities on the surfaces thereof increases the cross-sectional area and, in consequence, lowers the resistance of that portion of the conduit. Accordingly, in this condition this section of the conduit is heated to a lesser extent than the remaining portion thereof and thus remains cooler than the remaining portion of the conduit. Considerable difficulty has been experienced due to solidification of the molten alloy within this section of the conduit.

Cold areas in the feed conduit have also been a problem where the pipe passes through the wall of the alloy pot and also where it passes through the wall of the reactor pot. A nitrogen atmosphere must be maintained under pressure in each of these receptacles and thus the conduit passing therethrough must be tightly sealed therewith. However, with such construction, the effective cross-sectional area of the conduit is in consequence increased and, thus, the area of the conduit adjacent the receptacle covers tend to operate cooler than the remaining sections of the conduit. As pointed out above, such cooler areas have given considerable difficulty due to solidification of molten alloy therein.

Considerable experimentation has been directed to means and ways of eliminating such cold spots in the transfer conduit. For example, separate cartridge heaters have been connected to the feed conduit in the critical areas in an attempt to increase the temperature thereof to a point above the melting temperature of the alloy. In general, all such attempts have ended in unsatisfactory results.

It is accordingly an object of this invention to provide a liquid handling apparatus in which the liquid feed can be maintained at a relatively uniform and high temperature and at the same time can be protected against all deleterious oxidizing or similar conditions.

Another object of this invention is to provide a liquid handling apparatus for feeding molten metal, such as a sodium-lead alloy, from a melting or storage pot to a reactor pot while maintaining the entire system under a nitrogen atmosphere or similar inert gas and simultaneously maintaining the alloy throughout the transfer above the melting point of the metal.

Still another object is to provide a dip stick for a molten metal handling apparatus of the above type which is unaffected by the accumulation of dross thereon from the molten metal surface and thus which maintains a constant resistance in the section of the dip stick located within the molten metal storage pot.

Another object of the present invention is to provide a sodium-lead handling apparatus for feeding molten alloy to a reaction pot for reaction with ethyl chloride, which apparatus will eliminate the diffusion of ethyl chloride vapors into the alloy feed conduit when the flow of alloy through the conduit is interrupted or when a portion of the alloy empties therefrom.

Other objects and advantages of the present invention will become apparent as the description proceeds, especially when considered in connection with the accompanying drawings, wherein the figure is a front elevational view, partly in section, of a liquid handling apparatus embodying the novel features of the present invention.

The liquid handling apparatus illustrated in the drawing is especially designed for the purpose of feeding a molten sodium-lead alloy to a reaction pot for reaction with ethyl chloride to form tetraethyllead. While the present invention is highly useful for this purpose, it should be apparent that the invention is not limited to this use or to the exact arrangement of parts which are particularly adapted for the illustrated purpose.

In general, the liquid handling apparatus embodying the features of the present invention for transporting a liquid from one receptacle to a second receptacle, comprises a conduit connecting the receptacles through which the liquid is adapted to be transferred and forming an electrical resistance for heating thereof in response to a current flow therethrough, the liquid inlet end of the conduit extending below the liquid level in the first receptacle. The apparatus also includes an electrical circuit for heating the conduit including, in series, the liquid in the first receptacle and the entire length of the conduit. The apparatus is suitable for feeding liquid into a receptacle having an inert gas atmosphere therein, the conduit connecting the systems or receptacles being connected or communicating with an inert gas inlet line adjacent to but spaced from the outlet end thereof, the outlet end of the conduit providing a common orifice for ejecting the liquid into the second system and also for supplying inert gas to the second system.

More particularly, the apparatus is used to feed molten sodium-lead alloy from an alloy storage or melt pot 20 to a reaction pot 30. As shown in the figure, the apparatus includes a continuous conduit 40 having its opposite ends positioned within the alloy pot and the reactor pot. The lower end 50 thereof extends below the surface of the molten alloy 10 within the alloy pot and its opposite end normally terminates somewhat above the level of the alloy-ethyl chloride reaction mass 14 in the reactor pot 30. A nitrogen inlet line 90 and 91 is provided for each receptacle for maintaining the systems under a nitrogen atmosphere. Suitable electrical connectors 100 and 101 provide electrical current for the apparatus from a suitable electrical source (not shown).

The source of electrical energy may be direct, alternating or pulsating current. Thus, the direction of current flow may be considered as flowing in either direction. For means of illustration, current enters through the electrical lead 100 which is secured to the cover 21 of the alloy pot 20 by means of bolt 22. The alloy pot is formed of electrical conducting material, such as steel, and the current is conducted therethrough into the molten mass of sodium-lead alloy 10. The current flows from the molten alloy through the conduit 40 and thence back to the source of electrical power through the electrical lead 101.

The conduit 40 is preferably a section of welded steel pipe having a generally uniform wall thickness. Normally, commercial pipe is suitable for the purpose. The actual resistance per unit length of the pipe is not critical since the voltage of the electrical source may be adjusted to provide any desired heating effect in the pipe.

The inlet end 50 or dip stick of the conduit 40 disposed within the alloy pot is provided with a protective sheath 51 for protecting the outer surface of the conduit 40 from deposition of impurities, such as dross, from the molten alloy 10 and also a gland 60 for securing the sheath to the cover 21 of the alloy pot 20 and for forming a pressure tight seal with the sheath.

The sheath 51 is preferably formed of metal or other rigid material and is in the form of an elongated cylinder. As shown, the sheath 51 is positioned concentric with the conduit 40 surrounding the same and extends from the lowermost end of the conduit externally of the alloy storage pot. The lower end of the sheath is secured to the conduit 40 and the annular space 52 is sealed thereat, preferably by welding an annular ring 53 between the sheath and conduit.

The gland 60 comprises a sleeve 61 provided with external threads 62 and is positioned surrounding the upper end of the sheath 51. The gland also includes a nut 64 threaded onto the upper end of the sleeve, and a pressure ring 65 slidably mounted around the sheath and positioned within the nut 64. The sleeve 61 is provided with an annular recess 63 which forms with the sheath 51 an annular cavity for retaining powdered talc 67 or similar packing material. A flange 68 is provided on the upper end of the pressure ring 65 which engages the nut 64 and provides a bearing surface when the nut is threaded onto the sleeve 61 to compress the powdered talc 67.

In assembly, the sleeve is threaded into the cover 21 of the alloy pot 20, and the adjacent portion of the conduit is both thermally and electrically insulated from the alloy pot cover. Thermal and electrical insulating material, such as glass fibers, may be employed to fill the annular space 52 between the conduit and the sheath. This construction prevents the formation of a cold spot in the conduit where it passes out of the alloy pot through the cover 21. In addition, the electrical current flow is compelled to flow through the entire length of the conduit to uniformly heat the same above the melting temperature of the alloy. In general, due to the normally large mass of alloy within the pot, most of the current will flow from the alloy pot 20, through the alloy and thence through the conduit 40. If desired, the ring 53 may be formed of an insulating material.

The end 70 of the conduit 40 which extends into the reaction pot 30 is similarly provided with a protective sheath 71 and a gland 80 for resealing and retaining the nitrogen under pressure within the reactor pot. As shown, in this construction, the protective sheath is secured by welding to the sleeve 85 and is threaded onto the lower end of the conduit 40. Obviously, a welded ring construction could also be used, if desired, such as is employed with the dip stick 50.

The sheath 71 extends through the cover 31 of the reactor pot 30 and is secured and sealed therewith, such as by welding. Secured to the sheath, externally of the reaction pot 30, is a nitrogen inlet tube 73 through which nitrogen is ejected into the annular void 72 between the sheath 71 and the conduit 40. The electrical lead 101 is secured to the inlet line 73 and thus the latter forms a preheat tube for the inlet nitrogen during operation of the apparatus.

The plurality of orifices 42 are provided in the conduit 40 adjacent the lower end thereof which communicate with the annular void 72 and provide an outlet for the pressurized nitrogen into the conduit 40. The outlet orifice 43 in the conduit 40 thus serves as a common orifice for both the nitrogen and the molten alloy. In addition, if the molten alloy recedes in the conduit for any reason, such as when the feed of alloy is interrupted, inert nitrogen fills the tube and also continues to flow out of the orifice 43 to prevent entry of ethyl chloride vapors from the gaseous phase 15 into the conduit.

The gland 80 is generally similar to the gland 60 except that it is electrically insulated from the conduit 40 by electrically insulating sections 81 and 82. As shown, the insulating section 81 extends between the conduit 40 and both the nut 83 and the pressure ring 84. The insulating section 82 extends between the conduit 40 and the inner surface of the sleeve 85. Talc or other suitable powdered electrical insulating material 87 is also provided within the recess 86 in the sleeve 85 and is compressed in assembled position to prevent leaking of nitrogen from the system upon threading of the nut 83 onto the sleeve 85 to exert pressure on the pressure ring 84.

The electrical power lead 101 is secured to the nitrogen inlet line 73 by means of a contractible ring 102 and a bolt 103.

The nitrogen inlet pipes 90 and 91 are connected to any suitable source of pressurized nitrogen. One source may be common to both systems. The pipe 90 is connected to a pressure regulator 92, which in turn connects to the T-shaped pipe 93. The lower end of the latter extends through the cover 21 of the alloy pot 20 and is sealed therewith, and the upper end is connected to a solenoid vent valve 94, adapted, when operated, to vent nitrogen to the atmosphere through the pipe 96. The nitrogen inlet tube 73 is connected to the nitrogen inlet line 91 through a flow meter 98 and a pressure regulator 99.

While any suitable means may be used to control the feed of alloy from the storage or melt pot to the reaction pot, such as a valve or pump, it has been found preferable to control the feed by varying the nitrogen pressure within the alloy pot. In pressure, 80 pounds pressure is desired in the reactor, depending somewhat upon the temperature therein. In general, the pressure differential to effect the desired feed of alloy through the conduit is about 40 pounds. It should be apparent however that this pressure differential is largely dependent upon specific equipment and process details, such as conduit dimensions and mass feeding rates. When it is desired to interrupt the flow of alloy, the solenoid vent valve 94 and pressure regulator 92 are operated to reduce the pressure within the alloy pot 20 to approximately the pressure of the reactor 30.

As is believed apparent from the foregoing, the present invention provides a liquid handling apparatus for transporting a hot liquid, such as molten sodium-lead alloy, from one receptacle to another receptacle without danger or difficulty of solidification of the liquid within the transfer conduit. The conduit is heated uniformly throughout the entire length of the conduit, from the end 50 positioned below the liquid level to its discharge end 70, thus eliminating cold spots previously encountered, particularly in the conduit sections within the alloy pot and within the reaction pot due to deposition of dross and reaction products, respectively, and in the areas where the conduit passes through the covers of the pots.

The nitrogen and sodium-lead alloy are discharged into the reactor through a common orifice. The ethyl chloride vapors, normally present in the reactor, are prevented from entering the conduit by a stream of nitrogen and, thus, any voids occurring within the conduit will be immediately filled by inert nitrogen. Thus, no difficulty is experienced in the operation of this apparatus due to the undesired reaction of alloy and ethyl chloride in the conduit.

It will be noted that the area of the conduit adjacent to the nitrogen ejection orifices is somewhat reduced, thus effectively increasing the electrical resistance in this area. Since, in general, this end is subjected to somewhat greater cooling effects, due to the discharge of the alloy into the nitrogen atmosphere of the reactor, it is highly advantageous to have increased heating at this point.

Another very desirable feature of the present invention is the provision of a preheat zone for the nitrogen entering the reactor pot and before it contacts the conduit carrying molten alloy. By the disclosed construction, the nitrogen is preheated to any desired extent by the same heating means used to heat the transfer conduit. Such a construction simplifies the apparatus and eliminates the need for special and costly heaters for this purpose.

I claim:

1. A liquid handling apparatus for transporting a hot liquid from one receptacle to a second receptacle having therein an atmosphere containing an inert gas, comprising a conduit connecting said receptacles and forming an electrical resistance for heating thereof in response to a flow of current therethrough; a protective sheath for each end of the conduit concentric with and surrounding the side portions thereof extending into said receptacle, said sheaths protecting the outer surfaces of said conduit from deposition thereon of substances which tend to cause cold spots in the conduit, said protective sheath within said second receptacle forming within said conduit a closed annular void and electrically connected to said conduit adjacent the end thereof; an inert gas tube communicating with said annular void for supplying inert gas to said second receptacle and for preheating said gas prior to entry into said void; an orifice in said conduit adjacent the outlet end thereof communicating with said annular void; an electrical circuit including, in series, the liquid in said first receptacle, the entire length of said conduit, said sheath positioned in said second receptacle and said inert gas tube; and means to pass an electric current through said electrical circuit.

2. A liquid handling apparatus for transporting a hot liquid from one receptacle to a second receptacle having therein an atmosphere containing an inert gas, comprising a conduit connecting said receptacles and forming an electrical resistance for heating thereof in response to a flow of current therethrough; a protective sheath for each end of said conduit concentric with and surrounding the side wall portions thereof extending into said receptacles, said sheaths protecting the outer surfaces of the conduit from deposition thereon of substances which tend to cause cold spots in the conduit, said protective sheath positioned within said second receptacle, forming with said conduit a closed annular void and electrically connected to said conduit and adjacent the end thereof; an inert gas line tube communicating with said annular void for supplying inert gas to said second receptacle; an orifice in said conduit communicating with said annular void; an electrical circuit including said conduit; and means to pass an electrical current through said electrical circuit.

References Cited in the file of this patent

UNITED STATES PATENTS

| Number | Name | Date |
| --- | --- | --- |
| 905,948 | Stromberg | Dec. 8, 1908 |
| 964,722 | West | July 19, 1910 |
| 1,068,643 | Franklin | July 29, 1913 |
| 1,126,079 | Queneau | Jan. 26, 1915 |
| 1,931,144 | Gilbert | Oct. 17, 1933 |
| 1,994,838 | Swoboda et al. | Mar. 19, 1935 |
| 2,135,183 | Junghans | Nov. 1, 1938 |
| 2,568,573 | Bennett | Sept. 18, 1951 |
| 2,577,837 | Zifferer | Dec. 11, 1951 |